United States Patent
Kim et al.

(10) Patent No.: US 9,522,594 B2
(45) Date of Patent: Dec. 20, 2016

(54) IMPROPER FUEL NOZZLE INSERTION-INHIBITING SYSTEM

(71) Applicant: ILLINOIS TOOL WORKS INC., Glenview, IL (US)

(72) Inventors: Edward Kim, Lake Zurich, IL (US); Miguel Sanchez, Shelby, MI (US); Paul M. Sutenbach, Highland Park, IL (US); Stephen Sperando, Glen Ellyn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/782,349

(22) PCT Filed: Mar. 27, 2014

(86) PCT No.: PCT/US2014/032068
§ 371 (c)(1),
(2) Date: Oct. 5, 2015

(87) PCT Pub. No.: WO2014/172087
PCT Pub. Date: Oct. 23, 2014

(65) Prior Publication Data
US 2016/0039280 A1    Feb. 11, 2016

Related U.S. Application Data

(60) Provisional application No. 61/812,515, filed on Apr. 16, 2013.

(51) Int. Cl.
*B60K 15/05*    (2006.01)
*B60K 15/04*    (2006.01)

(52) U.S. Cl.
CPC .............. *B60K 15/05* (2013.01); *B60K 15/04* (2013.01); *B60K 2015/047* (2013.01); *B60K 2015/0461* (2013.01); *B60K 2015/0483* (2013.01)

(58) Field of Classification Search
CPC .................................. B60K 15/05; B60K 15/04
(Continued)

(56) References Cited

U.S. PATENT DOCUMENTS 7,549,443 B2    6/2009   Levey et al.
7,950,425 B2    5/2011   Och
(Continued)

FOREIGN PATENT DOCUMENTS

DE    102008040715 A1    2/2010
EP       1155154 A1    11/2001
(Continued)

OTHER PUBLICATIONS

ISR and WO for PCT/US2014/032068 mailed Jun. 23, 2014.

*Primary Examiner* — Robert J Hicks
(74) *Attorney, Agent, or Firm* — Joseph M. Butscher; The Small Patent Law Group, LLC (57) ABSTRACT

A mis-fuel inhibitor (MFI) assembly is configured to prevent an improper fuel nozzle from dispensing fuel into a fuel tank. The assembly may include a main body having an MFI nozzle passage formed therethrough. The main body is configured to allow a proper fuel nozzle to pass through the MFI nozzle passage, and prevent the improper fuel nozzle from passing therethrough. The assembly may also include at least one securing member configured to connect to the main body within a fuel fill line. The securing member(s) is configured to securely retain the main body within the fuel fill line.

20 Claims, 6 Drawing Sheets

(58) Field of Classification Search
USPC ............................... 220/86.2, 86.1; 137/379
See application file for complete search history.

(56) References Cited

U.S. PATENT DOCUMENTS

| | | |
|---|---|---|
| 2001/0052311 A1 | 12/2001 | Stricker et al. |
| 2006/0032549 A1* | 2/2006 | McClung ............... B60K 15/04 141/97 |
| 2006/0096662 A1* | 5/2006 | King ..................... B60K 15/04 141/367 |
| 2007/0210607 A1 | 9/2007 | Murabayashi et al. |
| 2008/0295906 A1 | 12/2008 | McCracken et al. |
| 2011/0132906 A1 | 6/2011 | Miller et al. |
| 2012/0217240 A1 | 8/2012 | Dutzi et al. |

FOREIGN PATENT DOCUMENTS

| | | |
|---|---|---|
| FR | 2753138 A1 | 3/1998 |
| GB | 2450763 A | 1/2009 |
| WO | 0046410 A1 | 8/2000 |
| WO | 2005077698 A1 | 8/2005 |
| WO | 2009013558 A1 | 1/2009 |
| WO | 2010021829 A1 | 2/2010 |
| WO | 2011053563 A1 | 5/2011 |
| WO | 2011074593 A1 | 6/2011 |

\* cited by examiner

IMPROPER FUEL NOZZLE INSERTION-INHIBITING SYSTEM

RELATED APPLICATIONS

This application is a National Phase of International Application No. PCT/US2014/032068 filed Mar. 27, 2014 and relates to and claims priority benefits from U.S. Provisional Patent Application No. 61/812,515 filed Apr. 16, 2013, which is hereby incorporated by reference in its entirety.

FIELD OF THE DISCLOSURE

Embodiments of the present disclosure generally relate to fuel nozzle receiving systems of vehicles, and more particularly, to fuel nozzle receiving systems that are configured to inhibit improper or incompatible fuel nozzles from dispensing fuel into a fuel tank, such as the fuel tank of a commercial truck.

BACKGROUND OF THE DISCLOSURE

Various vehicles, such as automobiles, are powered by gasoline, diesel fuel, or the like. As such, the vehicles typically include fuel systems having a tank configured to retain fuel, such as gasoline or diesel fuel, and a fuel fill line that serves as an inlet for supplying fuel to the tank from a fuel nozzle of a refueling station. In general, a fuel fill line includes an opening that may be exposed during refueling to receive the nozzle. An exposed end portion of the fuel fill line is of sufficient size to receive a discharge tube of a refueling nozzle. The nozzle typically fits relatively loosely in the fuel fill line so that the nozzle may be quickly and easily inserted and removed from the fuel fill line.

Many passenger and commercial vehicles are powered through diesel fuel. However, many diesel powered vehicles are susceptible to being mis-fueled (for example, mistakenly fueled) with gasoline. Gasoline nozzles typically are smaller than diesel nozzles and may be inserted into a refueling orifice of a diesel powered vehicle. Conversely, the larger size of a diesel nozzle typically prevents it from being inserted into the smaller refueling orifice of a gasoline powered vehicle.

Accordingly, various fuel systems include a mis-fuel inhibitor (MFI). An MFI is a device configured to prevent a gasoline nozzle from being inserted into a diesel fuel tank, or vice versa. For example, one type of MFI includes an inlet having an opening that prevents mis-fueling by nozzles having a diameter that exceeds that of the opening. As an example, the MFI may include top and bottom doors. While an improper nozzle may be inserted past the top door, the nozzle generally is unable to engage the bottom door as the diameter of the nozzle is too large to pass through a passage proximate to the bottom door. Another type of MFI includes a locking bottom door that only allows a complimentary nozzle to fit therethrough. Additional MFI systems are disclosed in EP 1 155 154, WO 2005/077698, WO 2010/021829, WO 2011/053563, U.S. Pat. No. 7,950,425, U.S. Pat. No. 7,549,443, and FR 2 753 138, for example.

Another known MFI includes an actuator having a spring-biased C-ring. The spring-biased C-ring exerts a force into the actuator that tends to maintain the actuator in a retracted or closed position. A flap may be pivotally secured to the actuator. During nozzle insertion, a proper fuel nozzle abuts into the actuator proximate to an opening, and exerts an opening force into the actuator that overcomes the closing force of the spring-biased C-ring. The distal tip of the nozzle then abuts into the flap, which then pivots open. However, an improper nozzle is typically unable to pass into the actuator and/or force the actuator open to engage the flap.

In general, the MFI may be crimped to a plastic inlet of a fuel fill line. A metal cover is positioned over the MFI such that the MFI may be sandwiched between an outer surface of the plastic inlet and an inner surface of the metal cover. An O-ring is positioned between a portion of plastic inlet, the metal cover, and/or the MFI to provide a sealing interface therebetween. The MFI may be pressed and crimped between the metal cover and the inlet of the fuel fill line. As such, the process of securing an MFI to a fuel fill line may be time and labor intensive.

Additionally, MFIs that are used with automobiles are typically not sized and shaped to be used with respect to larger vehicles, such as commercial trucks. For example, the actuator used in an MFI for an automobile may simply be too small for an MFI of a commercial truck.

SUMMARY OF THE DISCLOSURE

Certain embodiments of the present disclosure provide a mis-fuel inhibitor (MFI) assembly configured to prevent an improper fuel nozzle from dispensing fuel into a fuel tank. The MFI assembly may include a main body having an MFI nozzle passage formed therethrough. The main body is configured to allow a proper fuel nozzle to pass through the MFI nozzle passage, and prevent the improper fuel nozzle from passing through the MFI nozzle passage. The MFI assembly may also include at least one securing member configured to connect to the main body within a fuel fill line. The securing member(s) is configured to securely retain the main body within the fuel fill line.

In at least one embodiment, the at least one securing member may include a first securing member configured to connect to a first end of the main body within the fuel fill line, and a second securing member configured to connect to the second end of the main body within the fuel fill line. The second end is opposite from the first end.

Each securing member may include a planar base configured to be secured within the fuel fill line. A securing nozzle passage is formed through the planar base. At least one resilient suspender may extend from the base. The resilient suspender(s) is configured to lodge the securing member(s) within the fuel fill line. The securing member(s) may be configured to secure the main body within an expanded securing chamber of the fuel fill line.

In at least one embodiment, the MFI assembly may include a cover that is configured to cooperate with the securing member(s) to secure the MFI assembly within the fuel fill line.

The main body of the MFI may include an actuating ring and a flap pivotally secured to the actuating ring.

In at least one embodiment, the securing member(s) is configured to securely fix the main body within the fuel fill line without a cover or separate and distinct seal.

Certain embodiments of the present disclosure provide an improper fuel nozzle insertion-inhibiting system configured to prevent an improper fuel nozzle from dispensing fuel into a fuel tank. The system may include a fuel fill line including a securing chamber connected to a fuel-dispensing pipe that connects to the fuel tank. The securing chamber has a first inner diameter and the fuel-dispensing pipe has a second inner diameter that is less than the first inner diameter.

The system may also include a mis-fuel inhibitor (MFI) assembly secured within the securing chamber. The MFI assembly may include a main body having an MFI nozzle passage formed therethrough. The main body is configured to allow a proper fuel nozzle to pass through the MFI nozzle passage, and prevent the improper fuel nozzle from passing through the MFI nozzle passage. The MFI assembly may also include a leading securing member connected to a first end of the main body within the fuel fill line. The leading securing member is proximate to the fuel-dispensing pipe and is incapable of passing into the fuel-dispensing pipe. The MFI assembly may also include a trailing securing member connected to a second end of the main body within the fuel fill line, wherein the second end is opposite from the first end. The leading and trailing securing members cooperate to secure the main body within the securing chamber.

In at least one embodiment, the fuel fill line may also include a nozzle inlet connected to the securing chamber opposite from the fuel-dispensing line. The nozzle inlet has a third inner diameter that is greater than the second inner diameter and less than the first inner diameter. The MFI assembly is configured to be urged through the nozzle inlet and securely lodged within the securing chamber.

In at least one embodiment, the fuel fill line may also include an open mouth connected to the securing chamber opposite from the fuel-dispensing line.

Certain embodiments of the present disclosure provide a mis-fuel inhibitor (MFI) assembly configured to prevent an improper fuel nozzle from dispensing fuel into a fuel tank. The MFI assembly is configured to be secured within a fuel fill line having an expanded securing chamber connected to a fuel-dispensing pipe. The MFI assembly may include a main body having an MFI nozzle passage formed therethrough. The main body is configured to allow a proper fuel nozzle to pass through the MFI nozzle passage, and prevent the improper fuel nozzle from passing through the MFI nozzle passage. The main body may include an actuating ring and a flap pivotally secured to the actuating ring.

The MFI assembly may also include a leading securing member configured to connect to a first end of the main body within the fuel fill line. The leading securing member is configured to be proximate to a fuel-dispensing pipe and is sized to be incapable of passing into the fuel-dispensing pipe. Additionally, a trailing securing member is configured to connect to a second end of the main body within the fuel fill line. The second end is opposite from the first end. The leading and trailing securing members are configured to cooperate to secure the main body within the securing chamber of the fuel fill line. Each of the leading and trailing securing members may include a planar base configured to be secured within the securing chamber.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DISCLOSURE

Figure 1:
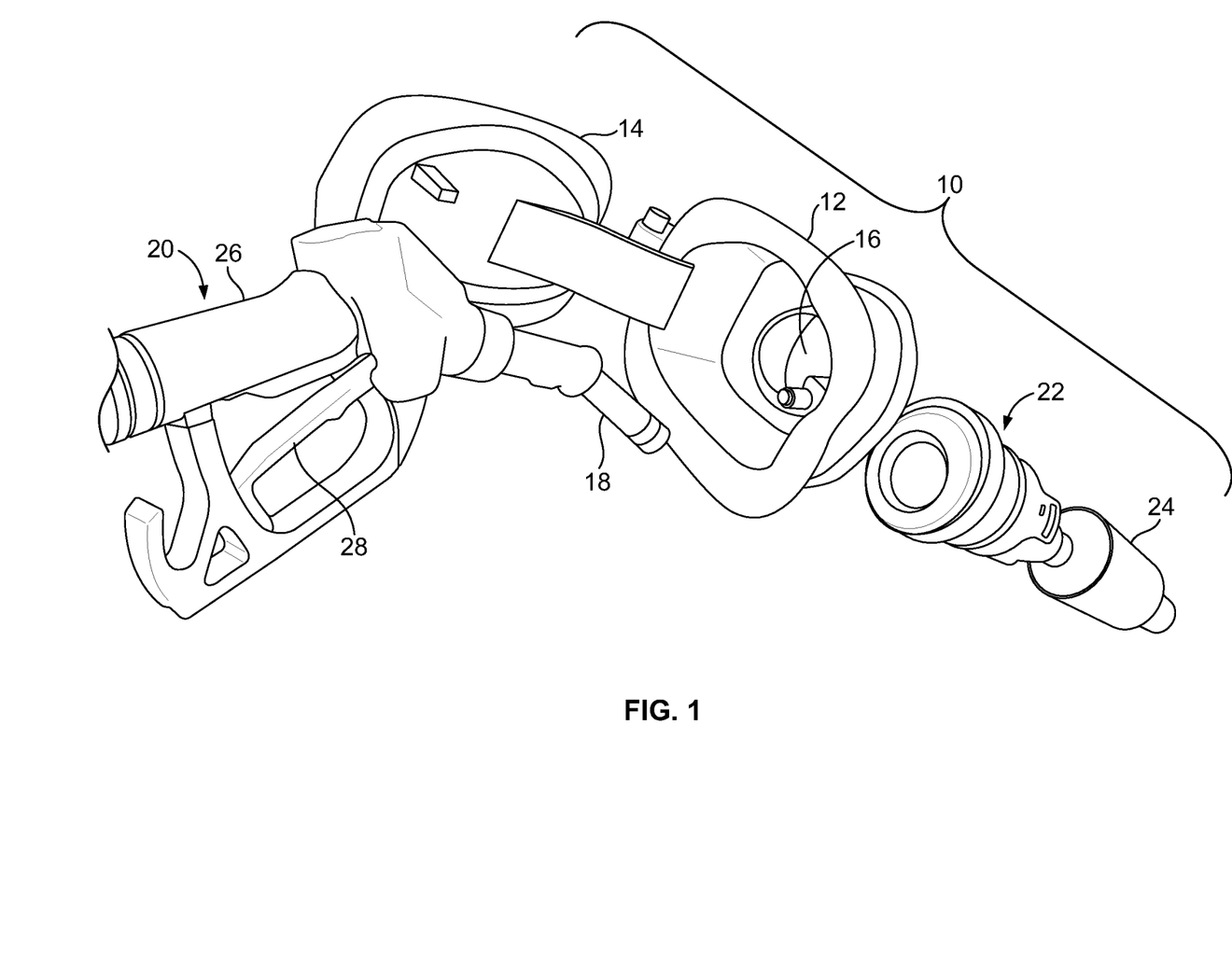
FIG. 1 illustrates a perspective view of a fuel intake system, according to an embodiment of the present disclosure.

FIG. 1 illustrates a perspective view of a fuel intake system 10, according to an embodiment of the present disclosure. The fuel intake system 10 may include a nozzle-receiving housing 12, which may be secured to a frame of a vehicle, for example. The nozzle-receiving housing 12 may include a door 14 that pivotally connects to the housing 12. The door 14 is configured to be pivoted between open and closed positions. The housing 12 defines an opening 16 into which a nozzle 18 of a fuel-dispensing device 20 may be inserted.

The housing 12 may directly or indirectly connect to an improper fuel nozzle insertion-inhibiting assembly, such as a mis-fuel inhibitor (MFI) assembly 22. The MFI assembly 22 is configured to prevent improper fuel-dispensing devices (for example, fuel-dispensing devices that are incompatible with the fuel intake system 10) from dispensing fuel into a fuel fill line 24 connected to the MFI assembly 22. For example, the MFI assembly 22 prevents a diesel fuel-dispensing device from being inserted into a gasoline fuel intake system, or vice versa. That is, a diesel fuel-dispensing device is an improper or incompatible fuel-dispensing device in relation to a gasoline fuel intake system, while a gasoline fuel-dispensing device is an improper or incompatible fuel-dispensing device in relation to a diesel fuel intake system. As explained below, the MFI assembly 22 may be configured to be securely retained within an expanded securing chamber of the fuel fill line 24.

The fuel-dispensing device 20 includes a handle 26 operatively connected to a trigger 28. The handle 28 is configured to be grasped by an operator and connects to the nozzle 18.

Figure 2:
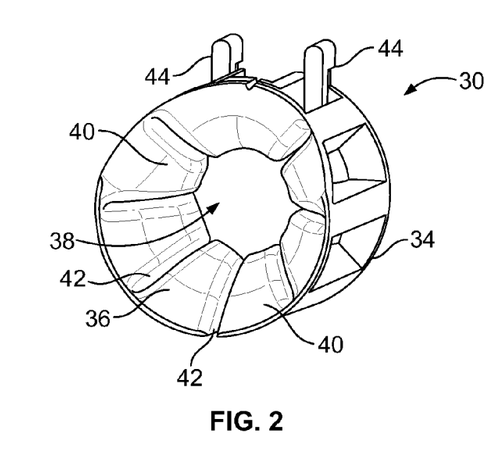
FIG. 2 illustrates a perspective front view of an actuating member, according to an embodiment of the present disclosure.

FIG. 2 illustrates a perspective front view of an actuating member 30, according to an embodiment of the present disclosure. An MFI assembly, such as the MFI assembly 22 (shown in FIG. 1), may include the actuating member 30, such as a flexible ring, constrictor, or the like. The actuating member 30 may represent an example of an MFI main body or MFI base structure. The actuating member 30 may include an outer circumferential wall 34 and an inner nozzle-receiving surface 36 surrounding a nozzle passage 38. The inner nozzle-receiving surface 36 may include a plurality of guide protuberances 40 (which may be wedge-shaped, for example) separated by gaps 42, such as slits, or the like. Opposed flap-securing columns 44 may extend upwardly from a top surface of the outer circumferential wall 34. The opposed flap-securing columns 44 cooperate to securely and pivotally retain an extension beam, for example, of a flap that is configured to cover an outlet end of the nozzle passage 38. A spring-biased ring, such as a C-ring, may be positioned over or within the outer circumferential wall 34.

In operation, as a proper fuel nozzle is moved toward the nozzle passage 38, a distal tip of the fuel nozzle abuts into the guide protuberances 40, thereby forcing them to outwardly spread so that the fuel nozzle may pass into the nozzle passage 38. With continued urging of the proper fuel nozzle into the nozzle passage 38, the distal tip abuts into a front surface of the flap, thereby pivoting the flap into an open position about the interface between the extension beam and the flap-securing columns 44.

Conversely, an improper fuel nozzle is sized and shaped so as to be unable to force the guide protuberances 40 into an open position. For example, the improper fuel nozzle may be too large to fit between the guide protuberances 40. As another example, if the improper fuel nozzle is small enough to fit between the guide protuberances 40, the size of the improper fuel nozzle may not be able to contact the guide protuberances 40 with sufficient force to spread the guide protuberances 40 into an open position. For example, one or more of the guide protuberances 40 may be operatively connected to a latch member that connects to the flap. When the guide protuberances 40 are opened, the latch may disengage from the flap, thereby allowing the flap to be opened. However, if the guide protuberances 40 are not spread open, the latch remains secured to the flap, thereby preventing the flap from being opened. In this manner, the actuating member 30 may be configured to prevent improper fuel nozzles from passing into a fuel fill line.

While an MFI assembly is described as including the actuating member 30, various other MFI assemblies may be used. For example, instead of a spreadable actuating member 30, an MFI assembly may include a pivotal flap that clamps, locks, latches, or otherwise secures to a distal tip of an improper fuel nozzle, thereby preventing the improper fuel nozzle from pivoting the flap open. It is to be understood that the actuating member 30 shown in FIG. 2 is merely an example of a component that may be used with an MFI assembly.

Figure 3:
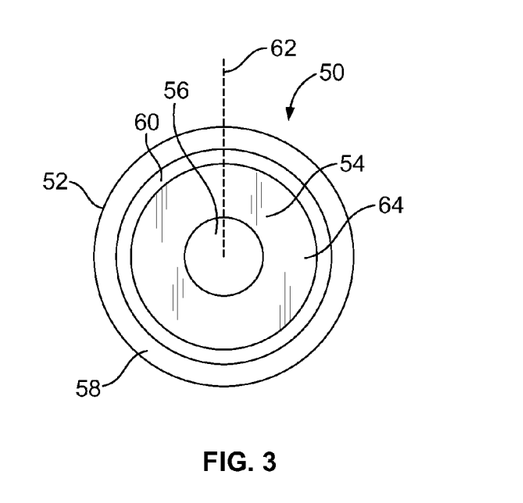
FIG. 3 illustrates a perspective front view of a securing member, according to an embodiment of the present disclosure.

FIG. 3 illustrates a perspective front view of a securing member 50, according to an embodiment of the present disclosure. The securing member 50 may form part of an MFI assembly. For example, the securing member 50 may cooperate with an MFI main body, such as the actuating member 30 shown in FIG. 1, to secure the MFI assembly within an expanded securing chamber of a fuel fill line.

The securing member 50 may include an annular body 52 having a planar base 54 surrounding a nozzle passage 56. A resilient suspender 58, such as a flexible, arcuate circumferential wall, may extend upwardly from the base 54. The resilient suspender 58 may have a wider diameter proximate to the base 54 than at a distal edge 60. As such, the resilient suspender 58 may inwardly curve towards an axial center 62 of the securing member 50 from the base 54 to the distal edge 60. An opening 64 is defined by the distal edge 60. The opening 64 may generally have a larger diameter than the nozzle passage 56.

The securing member 50 may be formed of a resilient material, such as an elastomeric material, such as a thermoplastic elastomer (TPE), rubber, or the like. As explained below, the securing member 50 is configured to abut into an end of an MFI assembly or a portion of the MFI assembly, such as an end of the actuating member 30 shown in FIG. 2, in order to securely retain the MFI assembly within a securing chamber of a fuel fill line.

Alternatively, various other types of resilient securing members may be used. For example, instead of a contiguous circumferential resilient wall, the resilient suspender 58 may include one or more resilient beams, such as spring arms, tabs, posts, protuberances, or the like, may extend from the base 54. As examples, two, three, four, or more regularly-spaced resilient spring arms may extend from the base 54.

The securing member 50 may form part of an MFI assembly, along with the actuating member 30, shown in FIG. 2, for example. An MFI assembly may include an MFI main body, such as the actuating member 30, and one or more securing members 50, as explained below.

Figure 4:
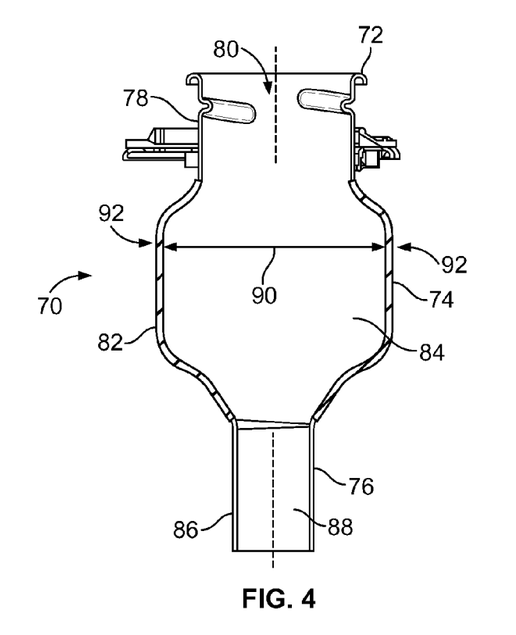
FIG. 4 illustrates an axial cross-sectional view of a fuel fill line, according to an embodiment of the present disclosure.

FIG. 4 illustrates an axial cross-sectional view of a fuel fill line 70, according to an embodiment of the present disclosure. The fuel fill line 70 may include a nozzle inlet 72 connected to an expanded securing chamber 74 that is in turn connected to a fuel-dispensing pipe 76. The nozzle inlet 72 includes a circumferential outer wall 78 defining a nozzle passage 80. The securing chamber 74 includes an outer wall 82 that integrally connects to the outer wall 78. The outer wall 82 of the securing chamber 74 defines an internal space 84 into which an MFI is configured to be secured. The fuel-dispensing pipe 76 includes an outer wall 86 that integrally connects to the outer wall 82. The outer wall 86 of the fuel-dispensing pipe 76 defines a fuel-dispensing passage 88.

The fuel fill line 70 may be molded and formed as an integral piece of material, such as metal, plastic, or the like. Alternatively, the nozzle inlet 72, the securing chamber 74, and/or the fuel-dispensing pipe 76 may be separate and distinct pieces that may be secured together, such as through welding.

The securing chamber 74 provides an expanded or otherwise enlarged volume of the fuel fill line 70 that is configured to accommodate an MFI assembly. The MFI assembly is configured to be securely retained within the expanded securing chamber 74. As shown, the securing chamber 74 has inner and outer diameters 90 and 92, respectively, that may exceed those of the nozzle inlet 72 and the fuel-dispensing pipe 76. For example, the inner diameter 90 of the securing chamber 74 may be configured to be larger than an outer diameter of an MFI assembly, and sized to allow the securing member 50 (shown in FIG. 3) to be securely suspended therein at an at-rest or expanded position. In contrast, the inner diameter of the nozzle inlet 72 may allow the MFI assembly to pass therein, but may be too narrow to allow the securing member 50 to pass therethrough at an at-rest or expanded position, for example. The inner diameter of the fuel-dispensing pipe 76 may be too small to allow either the MFI assembly or the securing member 50 to pass therein.

Figure 5:
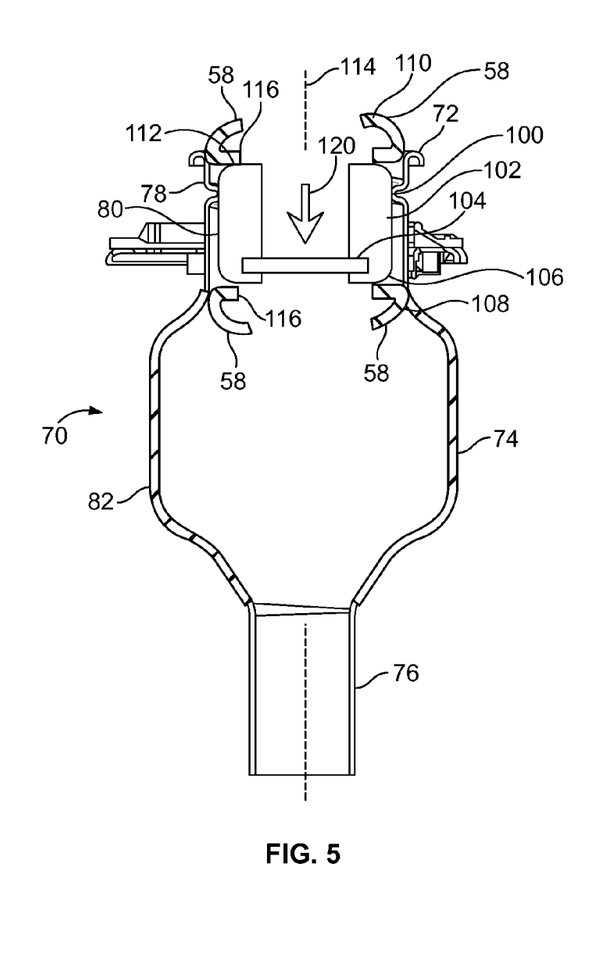
FIG. 5 illustrates an axial cross-sectional view of a mis-fuel inhibitor (MFI) device inserted into a nozzle inlet of a fuel fill line, according to an embodiment of the present disclosure.

FIG. 5 illustrates an axial cross-sectional view of a mis-fuel inhibitor (MFI) device 100 inserted into the nozzle inlet 72 of the fuel fill line 70, according to an embodiment of the present disclosure. The MFI assembly 100 may include an MFI main body 102, such as the actuating member 30 (shown in FIG. 1), and a pivotal flap 104 pivotally secured to an outlet end 106 of the MFI main body 102. Alternatively, various other types of MFI assemblies may be used.

A leading securing member 108 may be axially loaded at an outer surface of the outlet end 106 of the MFI main body 102. A trailing securing member 110 may be axially loaded at an outer surface of an inlet end 112 of the MFI main body 102. Thus, the MFI main body 102 may be axially positioned between the lead and trailing securing members 108 and 110 with respect to a central longitudinal axis 114 of the MFI assembly 100. The MFI assembly 100 may include the leading and trailing securing members 108 and 110.

As shown, the leading and trailing securing members 108 and 110, respectively, may be oriented in opposite directions. For example, the resilient suspenders 58 of the leading securing member 108 may be downwardly directed (as shown in FIG. 5), while the resilient suspenders 58 of the trailing securing member 110 may be upwardly directed (as shown in FIG. 5).

The leading and trailing securing members 108 and 110 may simply abut against outer surfaces of the MFI main body 102 without being securely fastened or connected thereto. Alternatively, bases 116 of the leading and trailing securing members 108 and 110 may be securely fastened to outer surfaces of the MFI main body 102, such as through adhesives, bonding, and/or the like.

In order to secure the MFI assembly 100 into the fuel fill line 70, the MFI assembly 100 is urged into the nozzle passage 80 of the nozzle inlet 72. The MFI assembly 100 is able to pass through the nozzle passage 80. However, the internal surfaces of the nozzle inlet 72 force the resilient suspenders 58 to inwardly collapse (towards the central longitudinal axis 114, for example), as the at-rest positions of the resilient suspenders 58 define a span therebetween that may be larger than the internal diameter of the nozzle inlet 72. In order to secure the MFI assembly 100 within the securing chamber 74, the MFI assembly 100 continues to be urged toward the securing chamber 74 in the direction of arrow 120.

Figure 6:
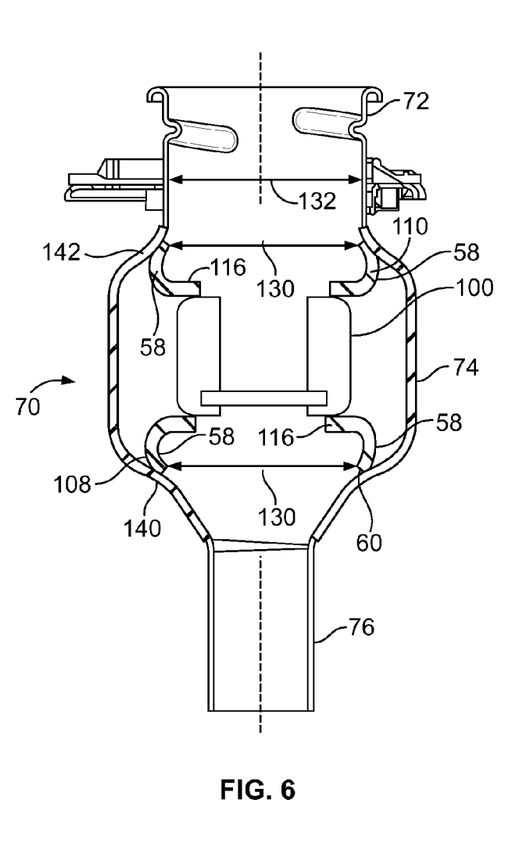
FIG. 6 illustrates an axial cross-sectional view of an MFI assembly securely retained within a securing chamber of a fuel fill line, according to an embodiment of the present disclosure.

FIG. 6 illustrates an axial cross-sectional view of the MFI assembly 100 securely retained within the securing chamber 74 of the fuel fill line 70, according to an embodiment of the present disclosure. As the leading securing member 108 passes into the securing chamber 74, the resilient suspenders 58 flex and expand back to at-rest or otherwise expanded positions, which define a greater span 130 than the internal diameter 132 of the nozzle inlet 72. Similarly, as the trailing securing member 110 passes into the securing chamber 74, the resilient suspenders 58 flex and expand back to at-rest or otherwise expanded positions, which define a greater span 130 than the internal diameter of the nozzle inlet 72.

When the MFI assembly 100 is fully within the securing chamber 74, distal edges 60 of the resilient suspenders 58 of the leading securing member 108 are wedged, lodged, fixed, or otherwise secured into a lower internal surface or ledge 140 of the securing chamber 74, while the distal edges 60 of the resilient suspenders 58 of the trailing securing member 110 are wedged, lodged, or otherwise secured into an upper internal surface or ceiling 142 of the securing chamber 74. The span 130 of the leading securing member 108 is too large to allow the leading securing member 108 to pass into the fuel-dispensing pipe 76, while the span 130 of the trailing securing member 110 is too large to allow the trailing securing member 110 to retreat back into the nozzle inlet 72. As such, the leading and trailing securing members 108 and 110, respectively, securely fix the MFI assembly 100 within the securing chamber 74 of the fuel fill line 70.

Accordingly, the MFI assembly 100 may be securely fixed in position within the fuel fill line 70 without the use of a separate and distinct cover. Further, because the MFI assembly 100 is secured within the fuel fill line 70, there is no need for a separate and distinct sealing device, such as an O-ring. As such, the MFI assembly 100 may be secured to the fuel fill line quickly and efficiently. The MFI assembly 100 may simply be inserted into the fuel fill line 70 and secured in the fuel fill line 70 by the securing members 108 and 110, in contrast to a labor and time intensive process of inserting a separate O-ring and crimping a separate and distinct cover to the fuel fill line.

Referring to FIGS. 1-6, unlike known MFI assemblies, embodiments of the present disclosure provide an MFI assembly that may be secured to a fuel fill line without the need for a separate and distinct seal, such as an O-ring. Further, embodiments of the present disclosure may not need a separate and distinct cover. Further, embodiments of the present disclosure allow the fuel fill line to be fully manufactured before the MFI assembly is installed therein.

As shown in FIGS. 5 and 6, the leading and trailing securing members 108 and 110 are used to secure the MFI assembly 100 within the securing chamber 74 of the fuel fill line 70. Alternatively, more or less securing members may be used. For example, a single securing member having at least a portion secured around an outer circumferential body of the MFI assembly 100 may be used.

Figure 7:
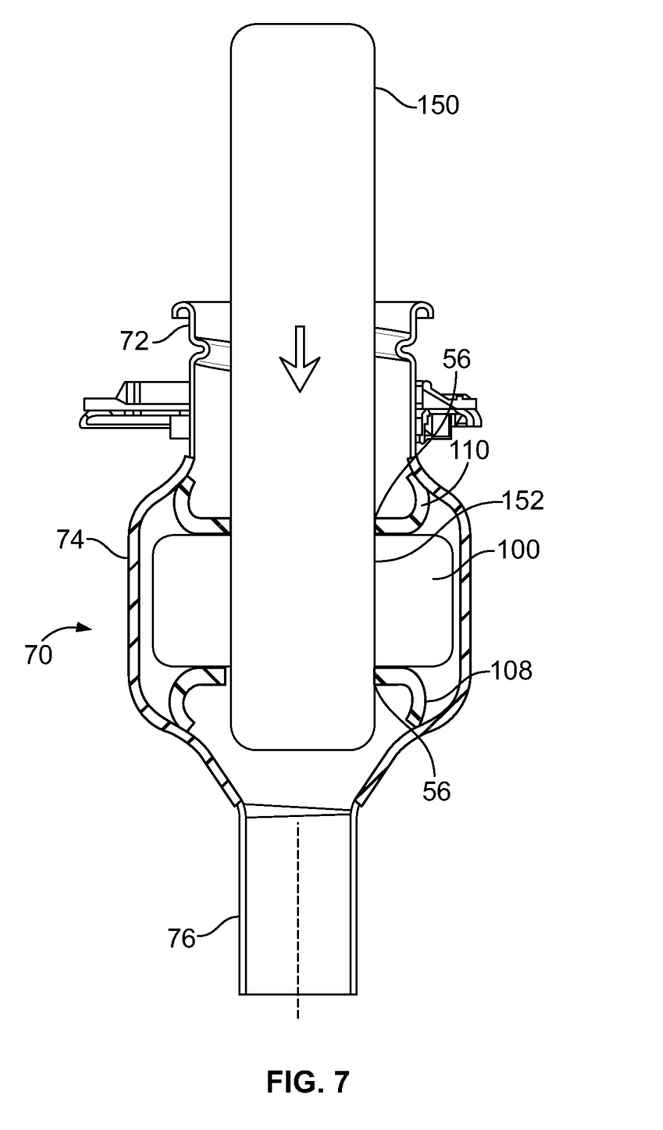
FIG. 7 illustrates an axial cross-sectional view of a proper fuel nozzle inserted through an MFI assembly within a securing chamber of a fuel fill line, according to an embodiment of the present disclosure.

FIG. 7 illustrates an axial cross-sectional view of a proper fuel nozzle 150 inserted through the MFI assembly 100, according to an embodiment of the present disclosure. As shown, the proper fuel nozzle 150 passes through the central nozzle passages 56 of the securing members 108 and 110, and the nozzle passage 152 of the MFI assembly 100. As such, the proper fuel nozzle 150 is able to dispense fuel into the fuel-dispensing pipe 76 of the fuel fill line 70.

Figure 8:
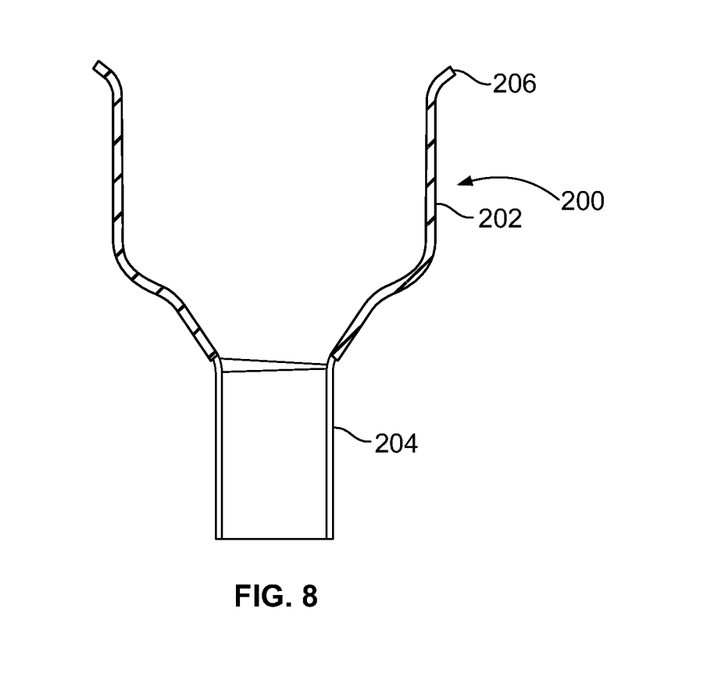
FIG. 8 illustrates an axial cross-sectional view of fuel fill line, according to an embodiment of the present disclosure.

FIG. 8 illustrates an axial cross-sectional view of fuel fill line 200, according to an embodiment of the present disclosure. The fuel fill line 200 includes a securing chamber 202 connected to a fuel-dispensing pipe 204. The securing chamber 202 includes an expanded mouth 206 configured to receive an MFI assembly.

Figure 9:
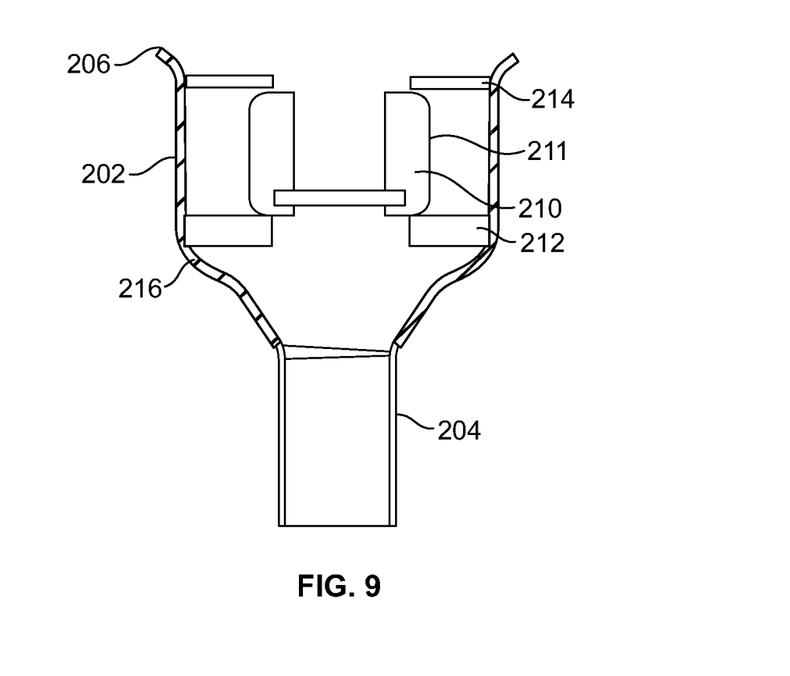
FIG. 9 illustrates an axial cross-sectional view of an MFI assembly securely retained within a securing chamber of a fuel fill line, according to an embodiment of the present disclosure.

FIG. 9 illustrates an axial cross-sectional view of an MFI assembly 210 securely retained within the securing chamber 202 of the fuel fill line 200, according to an embodiment of the present disclosure. As shown, an MFI main body 211 of the MFI assembly 210 is axially loaded between a leading securing member 212 and a trailing securing member 214. The securing members 212 and 214 may be similar to the securing members described above, except that the securing members 212 and 214 may not include the resilient suspenders 58. Instead, each of the securing members 212 and 214 may be a planar disc, for example, having a central nozzle passage.

The mouth 206 of the securing chamber 202 is wide enough to accept the securing members 212 and 214 and the MFI main body 211. The leading securing member 212 seats on a ledge or interior surface 216 of the securing chamber 202 proximate to the fuel-dispensing pipe 204. The leading securing member 212 is too wide to fit into the fuel-dispensing pipe 204. As such, the leading securing member 212 provides a base that supports the MFI assembly 210 in a suspended position within the securing chamber 202. The trailing securing member 214 is positioned over the MFI assembly 210 within the securing chamber. One or both of the leading and trailing securing members 212 and 214 may alternatively include resilient suspenders that exert a radially outward-directed force into internal surfaces of the securing chamber 202.

Figure 10:
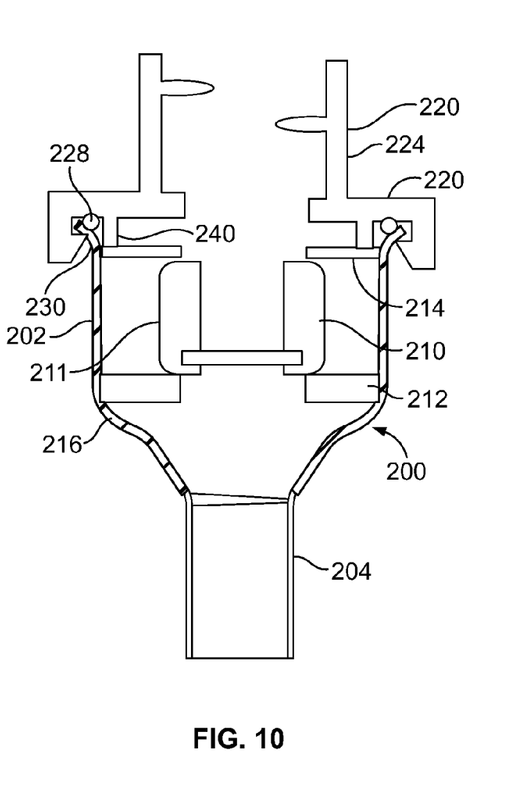
FIG. 10 illustrates an axial cross-sectional view of a cover secured over an MFI assembly that is securely retained within a securing chamber of a fuel fill line, according to an embodiment of the present disclosure.

FIG. 10 illustrates an axial cross-sectional view of a cover 220 secured over the MFI assembly 210 that is securely retained within the securing chamber 202 of the fuel fill line 200, according to an embodiment of the present disclosure. The cover 220 may include an inlet column 224 connected to a base 226. A sealing member 228, such as an O-ring, may be positioned between an inner surface of the mouth 206 and the base 226. The base 226 may snapably secure over an outer surface 230 of the mouth 206.

A compressing member 240, such as a ring, post(s), stud(s), or the like, may downwardly extend from the base 226 and abut into a top surface of the trailing securing member 214. Once the base 226 snapably secures to the mouth 206 of the fuel fill line 200, the compressing member 240 exerts a compressive force into the trailing securing member 214 that secures it in position. As such, the trailing securing member 214 is prevented from retreating out of the mouth 206. At the same time, the trailing securing member 214 is blocked from passing further into the securing chamber 202 due to the MFI main body 211 being suspended between the trailing securing member 214 and the leading securing member 212 that is lodged into the ledge 216 of the securing chamber 202. As such, the MFI assembly 210 may be securely fixed within the securing chamber 202 of the fuel fill line 200.

Figure 11:
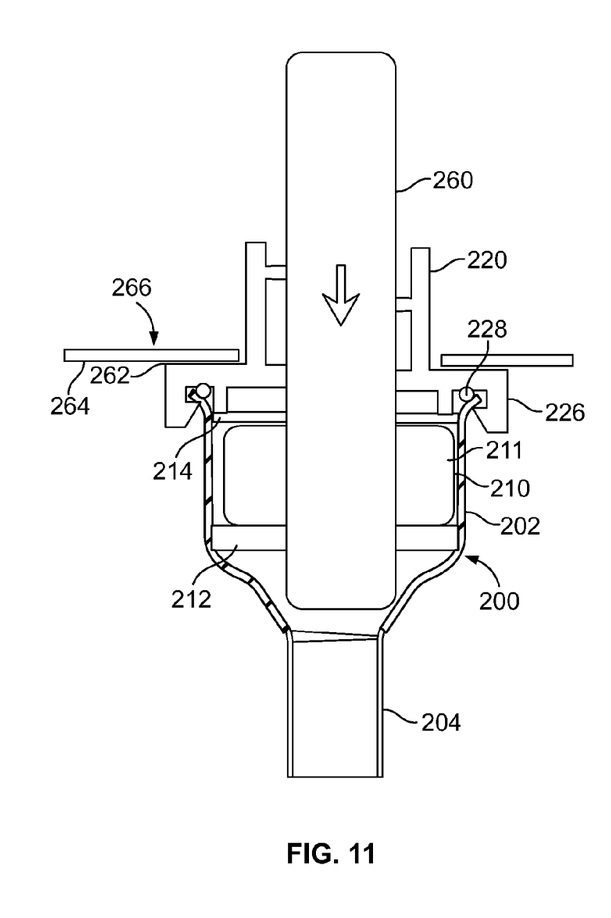
FIG. 11 illustrates an axial cross-sectional view of a proper fuel nozzle inserted through an MFI assembly within a securing chamber of a fuel fill line, according to an embodiment of the present disclosure.

FIG. 11 illustrates an axial cross-sectional view of a proper fuel nozzle 260 inserted through the MFI assembly 210 within the securing chamber 202 of the fuel fill line 200, according to an embodiment of the present disclosure. An upper or outer surface 262 of the base 226 of the cover 220 may be secured to a lower or inner surface 264 of a panel 266, such as an outer frame of a vehicle.

The proper fuel nozzle 260 is able to pass through the nozzle passages of the MFI assembly 210 and the securing members 212 and 214. As such, the proper fuel nozzle 260 may dispense fuel into the fuel-dispensing pipe 204 of the fuel fill line 200.

Referring to FIGS. 8-11, embodiments of the present disclosure may provide a system and method for securing an MFI assembly to a fuel fill line that may utilize a cover and a sealing member. Alternatively, the cover 220 may be overmolded with an elastomeric material, such as TPE, rubber, or the like, thereby eliminating the need for a separate O-ring or gasket.

Referring to FIGS. 1-11, embodiments of the present disclosure provide systems and methods for efficiently securing an MFI assembly within a fuel fill line. The fuel fill line may include an expanded securing chamber that allows the MFI assembly and one or more securing members to be positioned and secured therein.

Embodiments of the present disclosure may be configured to be used with larger vehicles, such as commercial trucks. The expanded securing chambers of the fuel fill lines may be able to accommodate larger and more robust MFI assemblies.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

Various features of the disclosure are set forth in the following claims.

The invention claimed is:

1. A mis-fuel inhibitor (MFI) assembly configured to prevent an improper fuel nozzle from dispensing fuel into a fuel tank, the MFI assembly comprising:
   a main body having an MFI nozzle passage formed therethrough, wherein the main body is configured to allow a proper fuel nozzle to pass through the MFI nozzle passage, and wherein the main body is configured to prevent the improper fuel nozzle from passing through the MFI nozzle passage; and
   at least one securing member configured to connect to the main body within a fuel fill line, wherein the at least one securing member is configured to securely retain the main body within the fuel fill line, and wherein the at least one securing member comprises at least one flexible and resilient portion that is configured to securely connect the main body to the fuel fill line and sealingly engage an interior wall portion of the fuel line.

2. The MFI assembly of claim 1, wherein the at least one securing member comprises:
   a first securing member configured to connect to a first end of the main body within the fuel fill line; and
   a second securing member configured to connect to a second end of the main body within the fuel fill line, wherein the second end is opposite from the first end.

3. The MFI assembly of claim 1, wherein the at least one securing member comprises a planar base configured to be secured within the fuel fill line, wherein a securing nozzle passage is formed through the planar base.

4. The MFI assembly of claim 3, wherein the at least one securing member further comprises at least one resilient suspender extending therefrom, wherein the at least one resilient suspender is configured to lodge the at least one securing member within the fuel fill line, and wherein the at least one resilient suspender is configured to deflect between a loading position and an expanded position in which the at least one resilient suspender sealingly engages the interior wall portion of the fuel line.

5. The MFI assembly of claim 1, wherein the at least one securing member is configured to secure the main body within an expanded securing chamber of the fuel fill line.

6. The MFI assembly of claim 1, further comprising a cover that is configured to cooperate with the at least one securing member to secure the MFI assembly within the fuel fill line.

7. The MFI assembly of claim 1, wherein the main body comprises an actuating ring and a flap pivotally secured to the actuating ring.

8. The MFI assembly of claim 1, wherein the at least one securing member is configured to secure the main body within the fuel fill line without a cover or separate and distinct seal.

9. An improper fuel nozzle insertion-inhibiting system configured to prevent an improper fuel nozzle from dispensing fuel into a fuel tank, the system comprising:
a fuel fill line including a securing chamber connected to a fuel-dispensing pipe that connects to the fuel tank, wherein the securing chamber has a first inner diameter and the fuel-dispensing pipe has a second inner diameter that is less than the first inner diameter; and
a mis-fuel inhibitor (MFI) assembly secured within the securing chamber, the MFI assembly comprising:
a main body having an MFI nozzle passage formed therethrough, wherein the main body is configured to allow a proper fuel nozzle to pass through the MFI nozzle passage, and wherein the main body is configured to prevent the improper fuel nozzle from passing through the MFI nozzle passage;
a leading securing member connected to a first end of the main body within the fuel fill line, wherein the leading securing member is proximate to the fuel-dispensing pipe and is incapable of passing into the fuel-dispensing pipe, wherein the leading securing member includes at least one first flexible and resilient portion that exerts a radially outward-directed force into a first internal surface of the securing chamber; and
a trailing securing member connected to a second end of the main body within the fuel fill line, wherein the second end is opposite from the first end, wherein the leading and trailing securing members cooperate to secure the main body within the securing chamber, wherein the trailing securing member includes at least one second flexible and resilient portion that exerts a radially outward-directed force into a second internal surface of the securing chamber.

10. The system of claim 9, wherein the fuel fill line further comprises a nozzle inlet connected to the securing chamber opposite from the fuel-dispensing line, wherein the nozzle inlet has a third inner diameter that is greater than the second inner diameter and less than the first inner diameter.

11. The system of claim 10, wherein the MFI assembly is configured to be urged through the nozzle inlet and securely lodged within the securing chamber.

12. The system of claim 9, wherein the fuel fill line further comprises an open mouth connected to the securing chamber opposite from the fuel-dispensing pipe.

13. The system of claim 9, wherein each of the leading and trailing securing members comprises a planar base configured to be secured within the securing chamber, wherein a securing nozzle passage is formed through the planar base.

14. The system of claim 13, wherein each of the at least one first flexible and resilient portion and the at least one second flexible and resilient portion comprises at least one radially-extending resilient suspender, wherein the at least one resilient suspender is configured to lodge the planar base within the securing chamber.

15. The system of claim 9, wherein the MFI assembly further comprises a cover that cooperates with the leading and trailing securing members to secure the MFI assembly within the securing chamber.

16. The system of claim 9, wherein the main body comprises an actuating ring and a flap pivotally secured to the actuating ring.

17. The system of claim 9, wherein the trailing and leading securing members secure the main body within the securing chamber without a cover or separate and distinct seal.

18. A mis-fuel inhibitor (MFI) assembly configured to prevent an improper fuel nozzle from dispensing fuel into a fuel tank, wherein the MFI assembly is configured to be secured within a fuel fill line having an expanded securing chamber connected to a fuel-dispensing pipe, the MFI assembly comprising:
a main body having an MFI nozzle passage formed therethrough, wherein the main body is configured to allow a proper fuel nozzle to pass through the MFI nozzle passage, wherein the main body is configured to prevent the improper fuel nozzle from passing through the MFI nozzle passage, and wherein the main body includes an actuating ring and a flap pivotally secured to the actuating ring;
a leading securing member configured to connect to a first end of the main body within the fuel fill line, wherein the leading securing member is configured to be proximate to a fuel-dispensing pipe and is sized to be incapable of passing into the fuel-dispensing pipe, wherein the leading securing member includes at least one first flexible and resilient portion that is configured to exert a radially outward-directed force into a first internal surface of the expanded securing chamber; and
a trailing securing member configured to connect to a second end of the main body within the fuel fill line, wherein the second end is opposite from the first end, wherein the leading and trailing securing members are configured to cooperate to secure the main body within the securing chamber of the fuel fill line, wherein the trailing securing member includes at least one second flexible and resilient portion that is configured to exert a radially outward-directed force into a second internal surface of the expanded securing chamber,
wherein each of the leading and trailing securing members comprises a planar base configured to be secured within the securing chamber, wherein a securing nozzle passage is formed through the planar base.

19. The MFI assembly of claim 18, wherein each of the at least one first flexible and resilient portion and the at least one second flexible and resilient portion comprises at least one radially-extending resilient suspender extending, wherein the at least one resilient suspender is configured to lodge the planar base within the securing chamber, wherein the trailing and leading securing members are configured to secure the main body within the securing chamber without a cover or separate and distinct seal.

20. The MFI assembly of claim 18, further comprising a cover that is configured to cooperate with the leading and trailing securing members to secure the MFI assembly within the securing chamber.

\* \* \* \* \*